US006317172B1

(12) United States Patent
Huynh

(10) Patent No.: US 6,317,172 B1
(45) Date of Patent: Nov. 13, 2001

(54) PROTECTED LCD PARTICULARLY FOR THE INSTRUMENT PANEL OF A MOTOR VEHICLE INSTALLATION HAVING A BRANCH LINE BETWEEN THE POWER SUPPLY AND LCD OUTPUT

(75) Inventor: Tan Duc Huynh, Neuilly sur Marne (FR)

(73) Assignee: Valeo Electronique, Creteil Cedex (FR)

( * ) Notice: Subject to any disclaimer, the term of this patent is extended or adjusted under 35 U.S.C. 154(b) by 0 days.

(21) Appl. No.: 09/238,121

(22) Filed: Jan. 27, 1999

(30) Foreign Application Priority Data

Jan. 29, 1998 (FR) .................................................. 98 00997

(51) Int. Cl.[7] ........................ G02F 1/1333; G02F 1/1345

(52) U.S. Cl. ............................................... 349/40; 349/149

(58) Field of Search ........................ 349/149, 40; 345/58, 345/117; 340/461, 525

(56) References Cited

U.S. PATENT DOCUMENTS

| | | | |
|---|---|---|---|
| 4,629,289 * | 12/1986 | Streit | 349/149 |
| 4,954,807 | 9/1990 | Fleischer et al. | 340/459 |
| 5,737,053 * | 4/1998 | Yomogihara et al. | 349/149 |

FOREIGN PATENT DOCUMENTS

| | | |
|---|---|---|
| 37 36 761 | 5/1989 | (DE) . |
| 0 717 390 | 6/1996 | (EP) . |

OTHER PUBLICATIONS

Patent Abstracts of Japan, vol. 018, No. 532 (P–1810), Oct. 7, 1994 & JP 06 186592 A (Matsushita Electric and Co. Ltd.) Jul. 8, 1994.

Patent Abstracts of Japan, vol. 012, No. 224 (P–721), Jun. 25, 1988 & JP 63 018333 A (Hitachi Ltd; Others:01) Jan. 26, 1994.

* cited by examiner

*Primary Examiner*—Walter J. Malinowski
(74) *Attorney, Agent, or Firm*—Morgan & Finnegan LLP

(57) ABSTRACT

A device, particularly for the instrument panel of a motor vehicle, comprises a liquid crystal display module comprising a multiplicity of parallel inputs connected via a multiplicity of control lines to a multiplicity of outputs of a control module supplied by an electrical power supply. The output of the display module and the electrical power supply are connected to an electrical ground. A branch line has, on the one hand, an input connected to the electrical power supply and an output connected directly to the output of the display module, and has, on the other hand, an impedance considerably lower than the corresponding impedance of each pair formed by a control line and the output of the associated control module. The device is thus protected against electrostatic discharges.

10 Claims, 2 Drawing Sheets

PROTECTED LCD PARTICULARLY FOR THE INSTRUMENT PANEL OF A MOTOR VEHICLE INSTALLATION HAVING A BRANCH LINE BETWEEN THE POWER SUPPLY AND LCD OUTPUT

FIELD OF THE INVENTION

The invention relates to the field of liquid crystal display instrument panels, particularly for motor vehicles.

The invention is applicable to liquid crystal display units of the type called passive, in other words those comprising no diodes or transistors in the display unit.

This invention relates more particularly to devices for such instrument panels which comprise a display module comprising a multiplicity of parallel inputs connected via a multiplicity of control lines to a multiplicity of outputs of a control module supplied by an electrical power supply, the output of the display module and the electrical power supply being connected to an electrical ground.

BACKGROUND OF THE INVENTION

The control module consists principally of electronic switches, generally made from semiconductors which cannot withstand electrostatic discharges above approximately 2 kV. Now, it frequently occurs that discharges well in excess of 2 kV, typically 20 or 25 kV, are generated in the liquid crystal display module, as a result, in particular, of the surface stresses to which it may be subjected.

As a result of this, some switches of the control module may be damaged or even destroyed.

To overcome this disadvantage, those skilled in the art have proposed the fitting of a voltage limiting component, such as a Zener diode, to each output of the control module, in such a way that the discharges can be blocked, absorbed, and then dissipated in the form of heat. However, as the number of display segments increases, the number of outputs to be fitted with these components increases, and consequently the cost of the device and its dimensions also become considerable.

SUMMARY OF THE INVENTION

An advantage of certain embodiments of the present invention is therefore to provide a liquid crystal display module device which does not have the aforementioned disadvantage.

For this purpose, the invention proposes a device of the type described in the introduction, and in which at least one branch line is provided and has an input connected to the electrical power supply and an output connected directly to the output of the display module, the branch line having an impedance considerably lower than that of each pair consisting of a control line and the output of the associated control module.

In this way, since the impedance of a branch line with respect to ground is considerably lower than the impedance of each of the control lines added to that of the output of the control module associated with it, the high voltage of a discharge originating from the display module is spontaneously dissipated by the branch line in the direction of ground.

Preferably, the ratio of the impedance of a pair to the impedance of a branch line is at least greater than 10. More preferably, this ratio is at least greater than 100, and even more preferably it is at least greater than 1000.

Additionally, the output of the display module is preferably connected to ground via a coupling resistor.

The invention is particularly applicable to devices designed to form part of an instrument panel of a heating and/or air conditioning installation of a motor vehicle.

BRIEF DESCRIPTION OF THE DRAWINGS

In the following description, provided by way of example, reference is made to the attached drawings, in which.

DESCRIPTION OF THE PREFERRED EMBODIMENTS OF THE INVENTION

Figure 1:
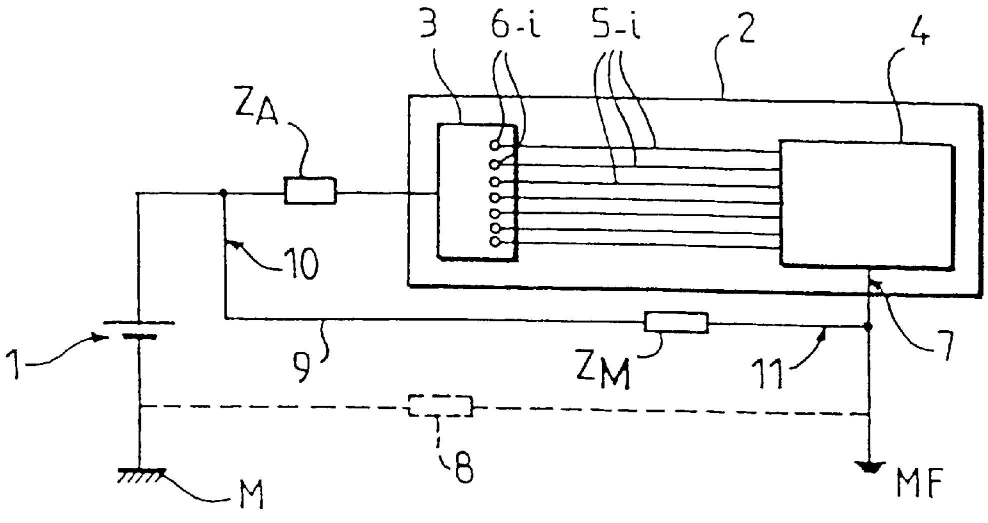
FIG. 1 is a schematic of a liquid crystal display module device according to the invention.

Reference will be made initially to FIG. 1 for the description of the schematic diagram of a device according to the invention in an application, which is not limiting on the invention, to an instrument panel of an air conditioning installation of a motor vehicle.

The device comprises a power supply 1 connected to a ground M, for example that of the vehicle, and designed to supply an electronic module 2 comprising a control module 3 and a liquid crystal display (LCD) module 4.

The LCD display module 4 is divided into a multiplicity N of areas, for example N=7, provided with liquid crystals whose optical properties can be modified by an electrical field, as is well known to those skilled in the art. Each of these parts is connected to one are more control line 5-*i* (where 1=1 to N). Each control line 5-*i* is itself connected to an output 6-*i* of N outputs of the control module 3, which forms a switch designed to control the supply of the N parts of the display module 4. In other words, this control module 3 is capable, at the command of a control unit of the installation not shown, of energising one or more parts of the display module, or in other words of connecting the selected outputs 6-*i* to the circuit supplied by the power supply 1.

Preferably, the control module 3 is made from semiconductors which are known to those skilled in the art, and which therefore do not need to be described here.

The display module 4 comprises an output 7 which is connected to a floating ground MF, which is itself connected to the ground M via a coupling resistor 8.

According to the invention, the device comprises a branch line 9 in parallel with the electronic module 2 in such a way that its input 10 is connected to the power supply 1, while its output 11 is connected to the floating ground MF at the output 7 of the display module 4.

The device therefore comprises two parallel branches, one comprising the electronic module 2 and the other comprising the branch line 9, connected at one end to the electrical power supply 1 and at the other end to the floating ground MF.

The branch line 9 (or ground line) is chosen in such a way that, when seen from the ground end, it has an impedance at point $Z_M$ considerably lower than an impedance at point $Z_A$ representing the sum of the impedance of a control line and the output impedance of the switch to which it is connected, also when seen from the ground end. The term "output of a switch" is here taken to mean the output 6-*i* of the control module 3.

Preferably, the impedance at point $Z_A$ of the branch containing the electronic module 2 is at least 10 times greater than the value of the impedance at point $Z_M$ of the branch line 9. More preferably, this value of $Z_A$ is at least one hundred times greater than that of $Z_M$, and even more preferably it is at least one thousand times greater. For example, an impedance $Z_A \cong 10\ k\Omega$ and an impedance $Z_M \cong 1\ \Omega$ may be chosen.

It is important to specify that the elements impedances $Z_A$ and $Z_M$ shown in FIG. 1 are not components, but represent the impedances of the branch of the circuit in which they are respectively located.

By means of such a branch line 9, it is possible, when an electrostatic discharge occurs at the terminals of the display module 4, for example in case of a pressure stress generated by a user, to dissipate the high voltage generated by this discharge toward the ground M via the branch line 9.

It is thus possible to provide a good degree of protection for the semiconductor components forming this control module 3, without using limiter means such as Zener diodes, and consequently without adding components to each output 6-*i* of the control module 3.

Preferably, the display module 4 and the control module 3 are in the form of an integrated circuit.

Figure 2:
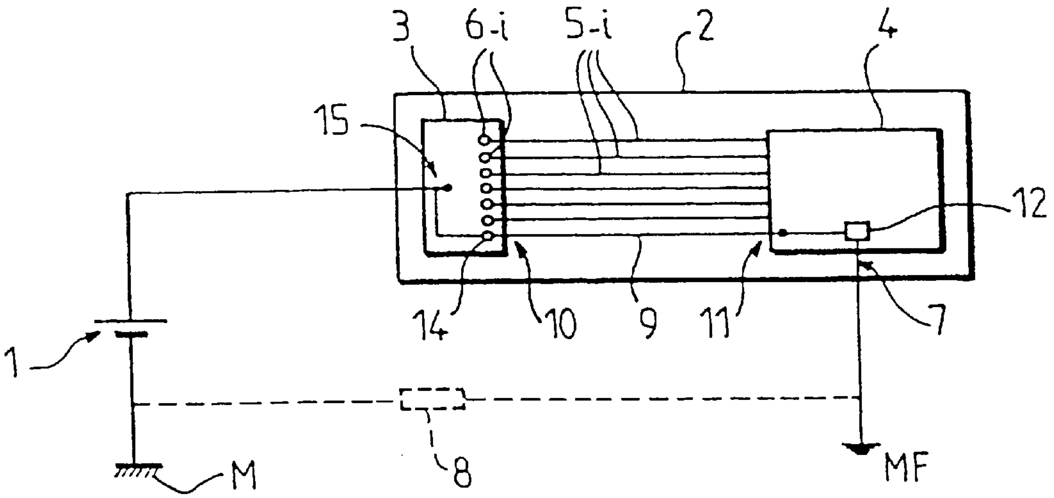
FIG. 2 is a variant of the schematic in FIG. 1.
Figure 3:
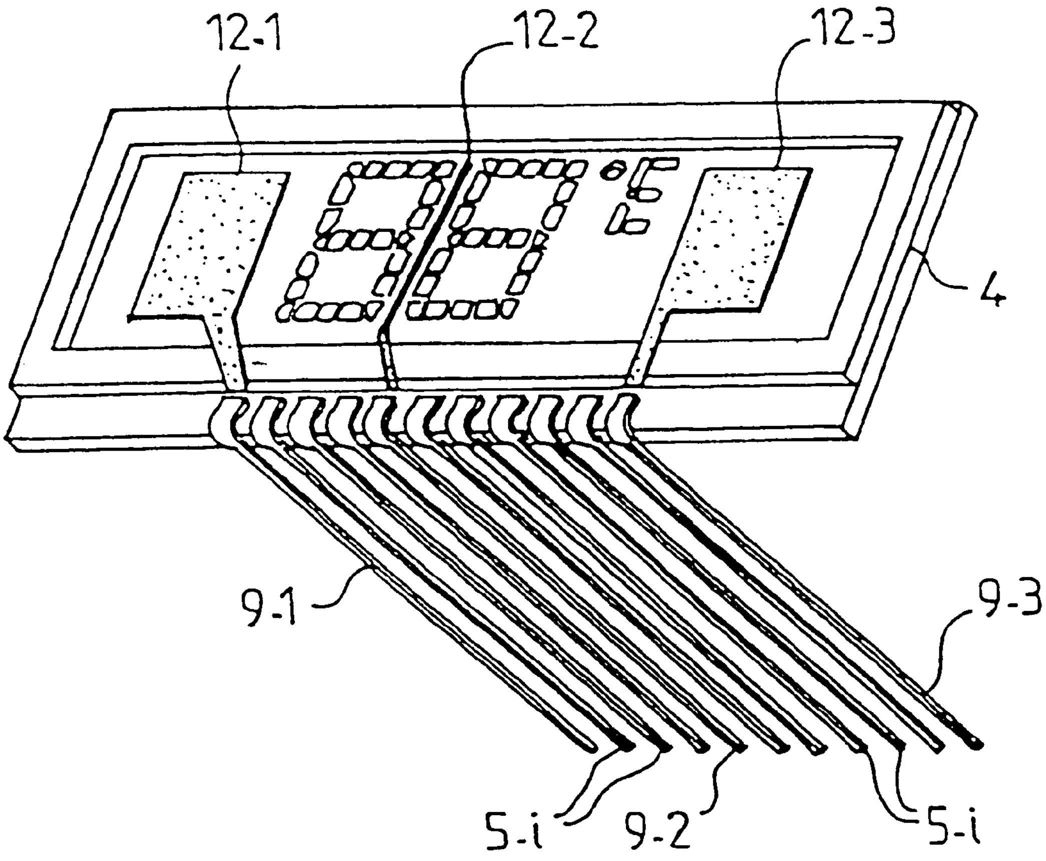
FIG. 3 shows a display module provided with its control and branch lines.

Also preferably, and as shown in FIG. 2, instead of being connected to the output 7 of the display module 4, the branch line 9 may be directly connected to a grounding area 12 which is formed on the surface of the printed circuit forming the display module 4 and is itself connected to the output 7. This enables the device to be simplified, since the control lines 5-*i* and branch line 9 can be made in the same way, in other words in the form of semi-rigid electrical conductors (for example, metal conducting strips), and form in combination a connection array, as illustrated in FIG. 3. In this embodiment, it is clear that the control module 3 must comprise a branch output 14 connected directly to its input 15 connected to the power supply 1, in such a way that the input 10 of the branch line 9 can easily be connected to said supply 1.

The device according to the invention may comprise, as shown in FIG. 3, a plurality of branch lines 9-1, 9-2, 9-3 of the type described previously. Such an arrangement may be found useful when the display module 4 is of smaller size. This is because, in these conditions, the printed circuit on which the liquid crystals are mounted is very congested, to the extent that it is difficult to connect a branch line to an area provided on the surface of the circuit for connection to the floating ground MF (output 7). A plurality of grounding surface areas 12-*j* (j=1 to 3, for example) may thus be formed on the printed circuit forming the display module 4.

This is the case, in particular, in the example shown in FIG. 3, in which three branch lines 9-1 to 9-3 are connected to three surface grounding areas 12-1 to 12-3 respectively. In this example, the different areas 12-*j* are connected to the output 7 (not shown) of the display module, and consequently to the floating ground MF. It is clear that the control module 3 must also have as many branch outputs 14-*j* as there are branch lines provided for the display module 4.

The invention is not limited to the embodiment described above, but covers all variants which may be developed by those skilled in the art within the scope of the following claims.

What is claimed is:

1. A liquid crystal display module device, comprising:

a display module for controlling a display, the display module having at least one display module input for receiving an electrical command signal which alters the display, the display module further having a display module output connected to an electrical ground;

a control module supplied by an electrical power supply and having at least one control module output for transmitting the electrical command signal to the display module;

at least one control line, each control line connecting one control module output to one display module input for transmitting the electrical command signal therebetween, wherein each control line, display module input and control module output form a pair; and at least one branch line operatively connected between said electrical power supply and the display module output, said at least one branch line for preventing an excessive electrostatic discharge on the at least one control line and having a first impedance value substantially lower than a second impedance value including each pair.

2. The device of claim 1, wherein a ratio of the second impedance value to the first impedance value is at least 10.

3. The device of claim 2, wherein said ratio is at least 100.

4. The device of claim 2, wherein said ratio is greater than 1000.

5. The device of claim 1, wherein the at least one control line is an electrically conductive connecting element.

6. The device of claim 1, wherein the at least one branch line is an electrically conductive connecting element.

7. The device of claim 1, wherein the display module includes a grounding area, wherein the display module output and the at least one branch lines are in electrical communication with the grounding area.

8. The device of claim 1, wherein the control module includes at least one branch output in electrical communication with the electrical power supply and the at least one branch lines.

9. The device of claim 1, wherein the display module output is connected to the electrical ground via a coupling resistor.

10. A motor vehicle comprising an instrument panel of at least one of a heating and an air conditioning installation, the instrument panel including the liquid crystal display device of claim 1.

* * * * *